United States Patent
Bishai

(10) Patent No.: US 12,415,438 B2
(45) Date of Patent: Sep. 16, 2025

(54) DUAL-BATTERY CHARGING SYSTEM FOR ELECTRIC VEHICLES

(71) Applicant: Kerolos Bishai, Naples, FL (US)

(72) Inventor: Kerolos Bishai, Naples, FL (US)

( * ) Notice: Subject to any disclaimer, the term of this patent is extended or adjusted under 35 U.S.C. 154(b) by 171 days.

(21) Appl. No.: 18/224,210

(22) Filed: Jul. 20, 2023

(65) Prior Publication Data

US 2024/0253522 A1 Aug. 1, 2024

Related U.S. Application Data

(60) Provisional application No. 63/442,680, filed on Feb. 1, 2023.

(51) Int. Cl.
*H02P 1/00* (2006.01)
*B60L 7/10* (2006.01)
*B60L 50/60* (2019.01)
*B60L 58/13* (2019.01)
*B60L 58/18* (2019.01)
*H02P 3/00* (2006.01)

(52) U.S. Cl.
CPC ............... *B60L 58/18* (2019.02); *B60L 7/10* (2013.01); *B60L 50/66* (2019.02); *B60L 58/13* (2019.02); *B60L 2240/547* (2013.01)

(58) Field of Classification Search
CPC .......... B60L 58/18; B60L 58/13; B60L 50/66; B60L 7/10
USPC ........................................... 318/139
See application file for complete search history.

(56) References Cited

U.S. PATENT DOCUMENTS

| | | | |
|---|---|---|---|
| 11,708,008 B2* | 7/2023 | Heydel | H02J 7/0019 318/139 |
| 2012/0083948 A1* | 4/2012 | Tate, Jr. | B60L 58/12 701/22 |
| 2013/0264975 A1* | 10/2013 | Kaita | B60L 58/20 318/139 |
| 2014/0320062 A1* | 10/2014 | Murayama | B60L 53/63 320/134 |
| 2016/0137097 A1* | 5/2016 | Kakeno | H01M 8/04373 318/139 |
| 2017/0210240 A1* | 7/2017 | Unno | B60L 50/51 |
| 2019/0296295 A1* | 9/2019 | Ortmann | H01M 50/249 |

* cited by examiner

*Primary Examiner* — Erick D Glass
(74) *Attorney, Agent, or Firm* — The Rapacke Law Group, P.A.

(57) ABSTRACT

The disclosed system includes two battery packs, at least one motor, a generator subsystem, controllers, and a switch wherein the battery packs are independent of one another but can either be undergoing charging or propelling an EV separately. A controller monitors comparative charge levels of the two battery packs and at a predetermined charge-difference value triggers the switch to reverse the roles of the battery packs.

20 Claims, 3 Drawing Sheets

DUAL-BATTERY CHARGING SYSTEM FOR ELECTRIC VEHICLES

TECHNICAL FIELD

This disclosure generally relates to charging and propulsion systems for electric vehicles.

BACKGROUND

One of the key parameters for electric vehicles (EVs) is range, which is determined by how far the vehicle can go, on average, starting with a fully charged battery pack and ending with a fully or near-fully discharged battery pack.

If the EV is to be driven 300 miles, for example, and its average range is 200 miles, it means the user will have to stop to recharge the battery pack before reaching the user's intended destination which is a time-consuming process. Internal combustion engine vehicles may also need to stop to refuel, but the process involves minutes rather than tens of minutes to possibly hours of delay as is the case with EVs.

EV original equipment makers (OEMs) extend a vehicle's range by making the traction motor more efficient, by making the battery pack larger thus adding charge capacity, or by aerodynamic improvements and overall weight reductions. Nevertheless, most EVs currently do not provide a range sufficient to overcome "range anxiety."

Conventional means for extending range may include energy regeneration and a battery-pack charging during downhill portions of a journey. However, where a trip involves essentially equal distances of downhill and uphill driving, any gain from downhill regeneration is typically lost in uphill losses.

EV OEMs continue to struggle with research and development aimed at significant breakthroughs in both range extension and battery-pack charging time reductions.

SUMMARY OF THE INVENTION SYSTEM

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The disclosed system makes use of two, separate battery packs, a traction motor and low-loss generator subsystem. Both the traction motor and low-loss generator are linked to the drive shaft, or equivalent, such that when the vehicle is propelled using the charge from a first battery pack, the generator subsystem is concurrently charging a second battery pack via a regenerative system, such as regenerative braking.

The battery pack providing propulsion will have its charge level dropping as the charge level of the second battery pack is increasing with the charging from the generator subsystem. At a predetermined level of comparative charge states, a controller or controllers will instruct a switch that the active battery pack such that the charging battery pack now becomes the propulsion battery pack, and the propulsion battery pack begins being charged.

If weight reduction, lowered aerodynamic drag, and efficient motor and generator are chosen, the system state will result in keeping some charge levels in both battery packs with reduced losses. Consequently, the point where it is incumbent on the user to stop and recharge the system using utility-provided power may be less frequent.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

Figure 1:
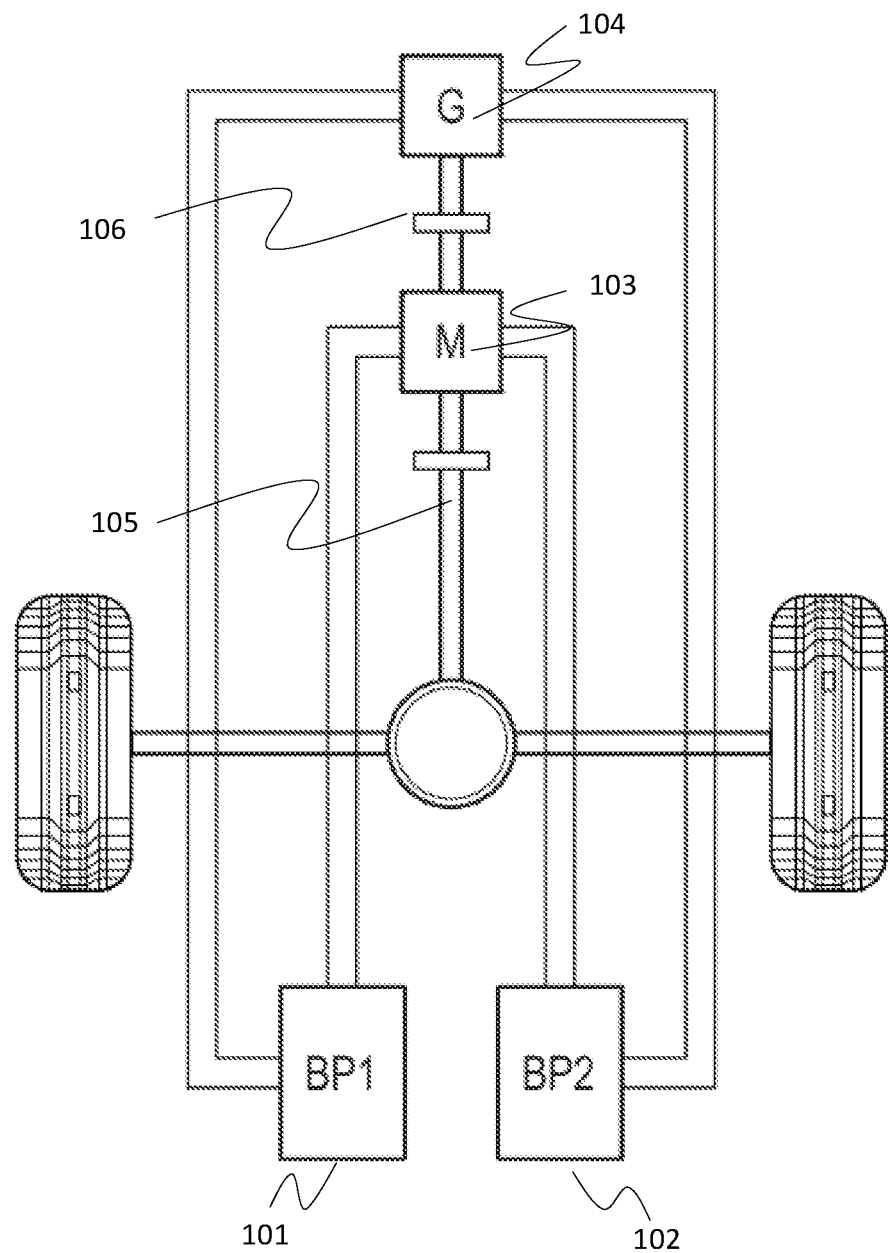
FIG. 1 depicts an illustrative variation of a dual-battery charging system for electric vehicles as disclosed herein.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

Essentially every EV currently available makes use of a single battery pack and one or more traction motors. Driving range is a function of weight, aerodynamics, motor efficiency and overall battery-pack charge capacity.

The disclosed system makes use of a pair of battery packs and at least one propulsion motor and a generator subsystem or regeneration subsystem. During propulsion sourced by one of the battery packs, the generator subsystem which is attached to the propulsion drive shaft is turning continuously and providing charging to the second battery pack.

A controller or controllers connected to the motor, generator, a switch, and the battery packs is constantly monitoring the comparative charge levels of the battery packs. At a predetermined charge-level delta, the controllers will essentially trigger the switch which in turn reverses the configuration such that the formerly propulsion source battery pack now is being charged, and the charging battery pack now is being used for propulsion. This ping-pong charging scheme ensures that each battery pack preserves a slowly dwindling upper charge level until the level is such that it is incumbent upon a user to connect the EV to a utility-powered charging source to replenish the charge levels of the battery packs.

By reducing weight, reducing aerodynamic drag, and choosing highly efficient traction motor and generator, it is possible to juggle the charge levels of the two battery packs in such a way as to reduce both the frequency and duration of a utility-powered charging sequence.

As a nonlimiting example, a first battery pack may have approximately 80% charge and may function as the battery pack powering propulsion. Simultaneously, the generator subsystem may charge a second battery pack. The system may include a controller and accompanying firmware or software for monitoring charge state in the first battery pack and a second battery pack. When the first battery pack charge drops below, as an example, 20% charge, the system instructs a controller to implement use of the second battery pack to power propulsion instead of the first battery pack. Simultaneously, the generator subsystem may charge the first battery pack.

The electric motor(s) may be constructed and arranged to convert electrical energy provided by the battery pack(s) into mechanical energy to provide propulsion to the vehicle. The electric motor(s) may be alternating current (AC) or direct current (DC) motors.

The battery packs may be constructed and arranged to store and deliver electrical energy that is used to propel the vehicle, operate various systems, and provide power to auxiliary systems. The battery packs may be rechargeable lithium-ion batteries, as a non-limiting example.

The generator subsystem may be a "regen system" utilizing the motor, or a standalone regen motor, to act as a generator during braking or coasting of an EV, converting the kinetic energy of the vehicle into electrical energy. Electrical energy is captured and fed back into either of the vehicle's battery pack for later use. The electrical energy generated during deceleration or braking is typically in the form of AC. The regenerative braking system's power electronics convert this AC energy into DC to match the voltage and characteristics of the vehicle's battery pack. The converted DC electrical energy is then sent to the vehicle's battery pack for storage. A battery management system regulates the charging process to ensure the batteries are charged safely and efficiently. The regen system may improve the overall efficiency of electric vehicles by reducing the amount of energy wasted as heat during traditional friction braking. By capturing and reusing the energy that would have been lost, regen systems can increase the driving range of electric vehicles and enhance their energy efficiency.

Alternatively, the generator subsystem may include alternator(s) constructed and arranged to convert mechanical energy from the vehicle drivetrain system, braking system, steering system, or the like, into electrical energy.

The controller and accompanying firmware or software may be constructed and arranged to facilitate operation of the system charging of either battery pack or initiating the change-over of either battery pack providing power to propulsions system or either battery pack being charged via the generator subsystem. The system may be configured for determining when a battery pack currently providing propulsion energy, and a battery pack being charged, should exchange roles. That is, the controlled determines when (such as predetermined battery charge level) and consequently instructs the battery pack allocated to propulsion should cease powering the vehicle and should begin being charged, and the charging battery pack should begin providing propulsion energy.

As shown in FIG. 1, a first battery pack 101 and a second battery pack 102 are connected both to traction motor, M, 103 and generator system, G, 104. Both the motor and generator system are connected to the vehicle propulsion system, 105 and 106, such that when the vehicle is propelled, the generator system G, 104 is generating electric energy which can be used to charge either the first or second battery pack 101, 102.

Figure 2:
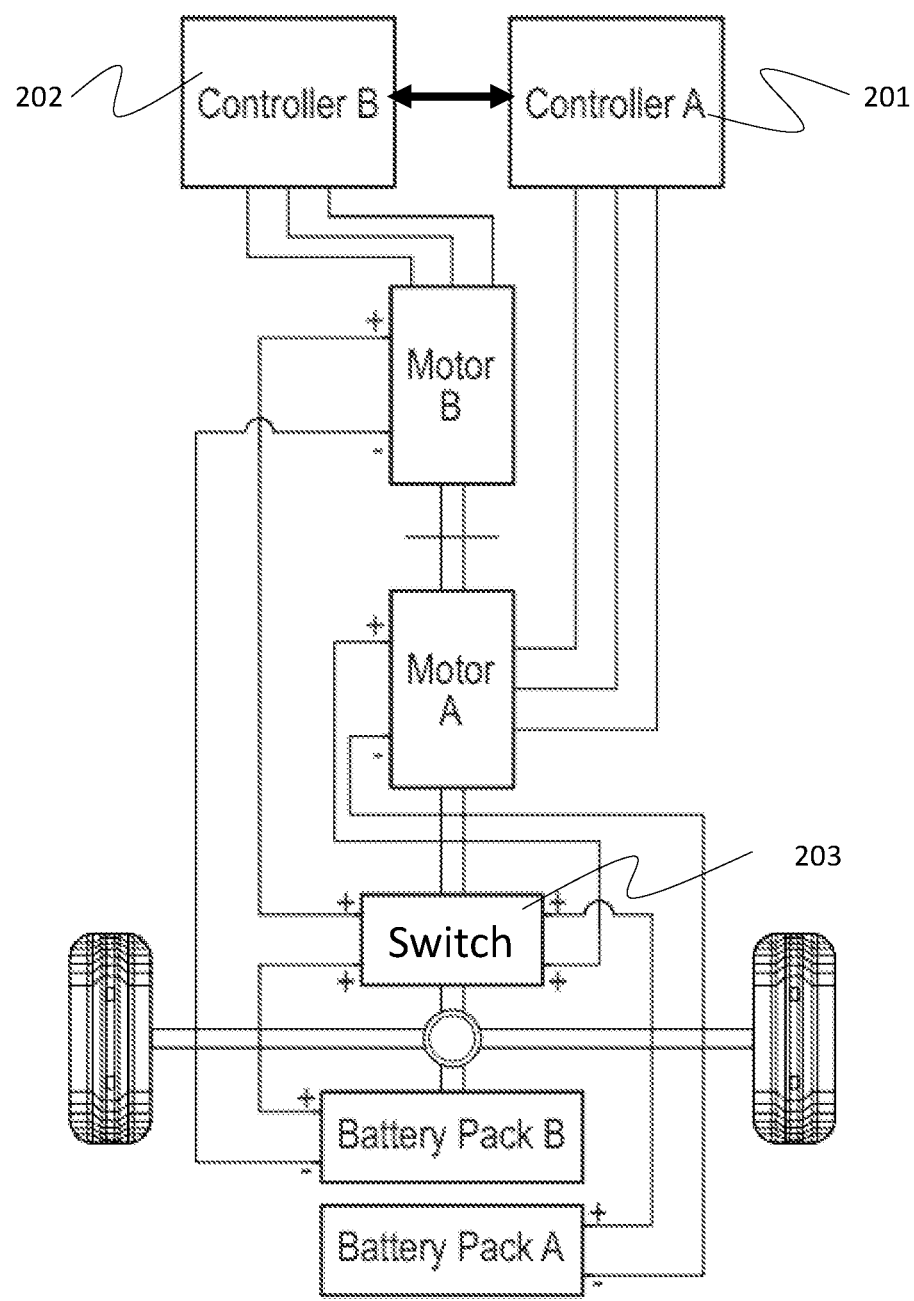
FIG. 2 depicts an illustrative variation of a dual-battery charging system for electric vehicles as disclosed herein.

In FIG. 2, the motor/generator configuration is shown as a motor dual motor arrangement A and B, and the first and second battery packs are now designated as battery pack A and B. The motors/generators and battery packs are operably coupled to one or more controllers 201 and 202. The controllers are also operably coupled to a switch, 203. In some embodiments, the switch 203 may be a relay or an electronic switch i.e. a software executable operating to facilitate the changeover from the first to second battery pack, or vice versa. This system may be constructed and arranged to monitor charge levels of the two battery packs and, based on a predetermined charge-difference-level, conditionally trigger the switch to reverse roles wherein the battery pack providing propulsion energy would then become a charging battery pack; and the charging battery pack would then become a propulsion battery pack.

Figure 3:
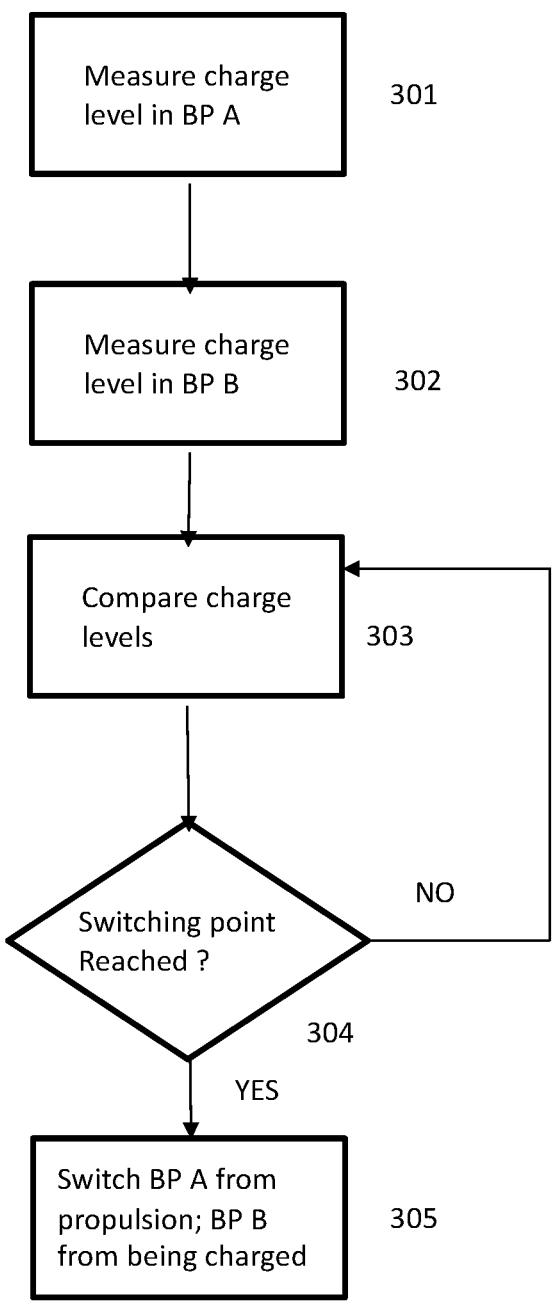
FIG. 3 depicts an illustrative variation of a dual-battery charging system for electric vehicles as disclosed herein.

An exemplary flow chart in FIG. 3 shows how the controllers could be programmed to monitor individual battery-pack charge levels, 301 and 302, then compare them (303), and conditionally decide when to switch the configuration (304 and 305).

Note that FIG. 1 shows distinct motors and generators whereas FIG. 2 shows motors that can serve as traction motors or generators. In either case, during any interval, one is providing propulsion whereas the other is providing charging.

Note also that two controllers are shown in FIG. 2. As is known in the art, the two controllers could be combined into a single controller. In either case, the functions would be the same and only the implementation details might differ.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a system may include a first battery pack; a second battery pack; a first motor in operative communication with a vehicle propulsion system, the first battery pack, and the second battery pack; a generator subsystem; and a controller configured to initiate use of at least one of the first battery pack or second battery pack to power the first motor.

Variation 2 may include a system as in variation 1, wherein the first battery pack includes a rechargeable lithium-ion battery pack.

Variation 3 may include a system as in variation 1 or 2, wherein the second battery pack includes a rechargeable lithium-ion battery pack.

Variation 4 may include a system as in any of variations 1 through 3, wherein the generator subsystem includes a regenerative system configured to convert kinetic energy of a vehicle into electrical energy.

Variation 6 may include a system as in any of variations 1 through 5, wherein the regenerative system is configured to convert kinetic energy of a vehicle into electrical energy via regenerative braking.

Variation 7 may include a system as in any of variations 1 through 6, wherein the regenerative system is configured to convert kinetic energy of a vehicle into electrical energy via regenerative deceleration.

Variation 8 may include a system as in any of variations 1 through 7, further including a battery management system configured regulate a charging process for at least one of the first battery pack or second battery pack.

According to variation 8, a method may include monitoring, via at least one controller, a first state of charge in a first battery pack in an electric vehicle; monitoring, via the at least one controller, a second state of charge in a second battery pack in the electric vehicle; determining, via the at least one controller, if the first state of charge or the second state of charge falls below a threshold value; instructing, via the at least one controller, use of at least one of the first battery pack or the second battery pack to power a motor in operable communication with a vehicle propulsion system; and instructing, via the at least one controller, a generator subsystem to charge at least one of the first battery pack or the second battery pack not powering the motor in operable communication with a vehicle propulsion system.

Variation 9 may include method as in variation 8, further including recurringly determining, via the at least one controller, if the first state of charge or the second state of charge falls below a threshold value; and recurringly instructing, via the at least one controller, use of at least one of the first battery pack or the second battery pack to power a motor in operable communication with a vehicle propulsion system.

Variation 10 may include method as in variation 8 or 9, further including instructing use of the first battery pack to power a motor in operable communication with a vehicle propulsion system.

Variation 11 may include method as in any of variations 8 through 10 further including instructing the generator subsystem to charge the second battery pack.

Variation 12 may include method as in any of variations 8 through 11 further including instructing use of the second battery pack to power a motor in operable communication with a vehicle propulsion system.

Variation 13 may include method as in any of variations 8 through 12 further including instructing the generator subsystem to charge the first battery pack.

Variation 14 may include method as in any of variations 8 through 13 wherein the first battery pack includes a rechargeable lithium-ion battery pack.

Variation 15 may include method as in any of variations 8 through 14 wherein the second battery pack includes a rechargeable lithium-ion battery pack.

Variation 16 may include method as in any of variations 8 through 15 wherein the generator subsystem includes a regenerative system configured to convert kinetic energy of a vehicle into electrical energy.

Variation 17 may include method as in any of variations 8 through 16 wherein the regenerative system is configured to convert kinetic energy of a vehicle into electrical energy via regenerative braking.

Variation 18 may include method as in any of variations 8 through 17 wherein the regenerative system is configured to convert kinetic energy of a vehicle into electrical energy via regenerative deceleration.

Variation 19 may include method as in any of variations 8 through 18 further including a battery management system configured regulate a charging process for at least one of the first battery pack or second battery pack.

According to variation 20, a system may include a first battery pack; a second battery pack; a first motor operative to propel a vehicle; a generator subsystem operative to charge at least one of the first battery pack or second battery pack; at least one controller operative to measure battery pack charge levels; the at least one controller operative to compare measured charge levels to a predetermined charge-level-difference value; the at least one controller operative to trigger a switch subsystem wherein the first battery pack is used to propel a vehicle and the second battery pack is being charged; and the at least one controller operative to trigger the switch subsystem wherein the first battery pack is being charged and the second battery pack is used to propel a vehicle; wherein the switch subsystem is configured to, under controller command, reverse roles of the first battery pack and the second battery.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A system comprising:
    a first battery pack; a second battery pack;
    a first motor in operative communication with a vehicle propulsion system, the first battery pack, and the second battery pack;
    a generator subsystem; and
    a controller configured to initiate use of at least one of the first battery pack or second battery pack to power the first motor, wherein the controller is further configured to monitor charge levels of both battery packs and trigger a switch subsystem to reverse roles between the battery packs based on a predetermined charge-level difference.

2. The system as in claim 1, wherein the first battery pack comprises a rechargeable lithium-ion battery pack.

3. The system as in claim 1, wherein the second battery pack comprises a rechargeable lithium-ion battery pack.

4. The system as in claim 1, wherein the generator subsystem comprises a regenerative system configured to convert kinetic energy of a vehicle into electrical energy.

5. The system as in claim 4, wherein the regenerative system is configured to convert kinetic energy of a vehicle into electrical energy via regenerative braking.

6. The system as in claim 4, wherein the regenerative system is configured to convert kinetic energy of a vehicle into electrical energy via regenerative deceleration.

7. The system as in claim 1, further comprising a battery management system configured regulate a charging process for at least one of the first battery pack or second battery pack.

8. A method comprising:
    monitoring, via at least one controller, a first state of charge in a first battery pack in an electric vehicle;
    monitoring, via the at least one controller, a second state of charge in a second battery pack in the electric vehicle;

determining, via the at least one controller, if the first state of charge or the second state of charge falls below a threshold value;

instructing, via the at least one controller, use of at least one of the first battery pack or the second battery pack to power a motor in operable communication with a vehicle propulsion system; and instructing, via the at least one controller, a generator subsystem to charge at least one of the first battery pack or the second battery pack not powering the motor in operable communication with a vehicle propulsion system, wherein the controller further instructs role reversal between the battery packs when a predetermined charge difference value is reached.

9. A method as in claim 8, further comprising:

recurringly determining, via the at least one controller, if the first state of charge or the second state of charge falls below a threshold value; and recurringly instructing, via the at least one controller, use of at least one of the first battery pack or the second battery pack to power a motor in operable communication with a vehicle propulsion system.

10. A method as in claim 9, further comprising:

instructing use of the first battery pack to power a motor in operable communication with a vehicle propulsion system.

11. A method as in claim 10, further comprising:

instructing the generator subsystem to charge the second battery pack.

12. A method as in claim 9, further comprising:

instructing use of the second battery pack to power a motor in operable communication with a vehicle propulsion system.

13. A method as in claim 12, further comprising:

instructing the generator subsystem to charge the first battery pack.

14. The method as in claim 8, wherein the first battery pack comprises a rechargeable lithium-ion battery pack.

15. The method as in claim 8, wherein the second battery pack comprises a rechargeable lithium-ion battery pack.

16. The method as in claim 9, wherein the generator subsystem comprises a regenerative system configured to convert kinetic energy of a vehicle into electrical energy.

17. The method as in claim 16, wherein the regenerative system is configured to convert kinetic energy of a vehicle into electrical energy via regenerative braking.

18. The method as in claim 16, wherein the regenerative system is configured to convert kinetic energy of a vehicle into electrical energy via regenerative deceleration.

19. The method as in claim 8, further comprising a battery management system configured regulate a charging process for at least one of the first battery pack or second battery pack.

20. A system comprising;

a first battery pack, a second battery pack; a first motor operative to propel a vehicle;

a generator subsystem operative to charge at least one of the first battery pack or second battery pack;

at least one controller operative to measure battery pack charge levels;

the at least one controller operative to compare measured charge levels to a predetermined charge-level-difference value;

the at least one controller operative to trigger a switch subsystem wherein the first battery pack is used to propel a vehicle and the second battery pack is being charged; and the at least one controller operative to trigger the switch subsystem wherein the first battery pack is being charged and the second battery pack is used to propel a vehicle;

wherein the switch subsystem is configured to, under controller command, reverse roles of the first battery pack and the second battery based on programmed state-of-charge thresholds and a continuous comparison of real-time voltage differentials.

* * * * *